United States Patent Office 2,711,378
Patented June 21, 1955

2,711,378

EMULSION, METHOD OF PREPARING SAME, AND METHOD OF APPLYING SAME

Rudolph J. Holzinger, North Merrick, N. Y., assignor to Socony Mobil Oil Company, Inc., a corporation of New York No Drawing. Application July 24, 1952,
Serial No. 300,780

17 Claims. (Cl. 117—164)

This invention relates to a composition having the capacity to impart water repellency to fibrous materials, to a method of preparing the same, and also to a method of applying the same to fibrous materials.

Wax emulsions have been used extensively, in combination with various compounds capable of imparting water repellency, for treatment of fabrics and paper. One of the favored types of compositions has been one containing aluminum salts of volatile acids such as acetic, formic, etc. The idea behind the inclusion of such aluminum salts was to deposit the aluminum compound on the fabric and then make the waterproofing film water repellent by evaporating the volatile acid therefrom. Many attempts have been made to produce finished compositions by use of emulsifiers and protective colloids, and a number of commercial products containing such materials are in use, but all of them possess poor stability in storage. Typical of such compositions are combinations of aluminum salts, proteins and emulsified wax. The poor stability manifests itself in so-called "creaming," "curding" and "skin formation." All of these phenomena are caused by coagulation of the wax particles into larger ones which, because of their lower specific gravity, tend to rise to the surface. The objectionable feature of storage instability lies in the fact that non-uniform coating of the fabrics results, and this, in turn, leads to spot failures of the finished water repellent textiles. The lack of homogeneity in waterproofing wax emulsions also leads to erratic dosages and subsequent failures in water repellent characteristics.

Compositions of the foregoing character have generally contained well-known emulsifiers and proteins. Typical of such emulsifiers are: high molecular weight amines; condensation products of ethylene oxides with fatty acids, phenols or high molecular weight alcohols; etc. Typical proteins used hitherto are: casein, gelatin, glue, albumin, etc. Compositions of satisfactory stability have been formed from the foregoing emulsifying agents and protective colloids, in combination with a salt such as aluminum acetate, provided the emulsion was used shortly following its preparation. In prolonged storage, poor stability has always been a serious handicap.

It is an object of this invention, therefore, to prepare wax emulsions, particularly for application to fibrous materials such as textiles and paper. It is also an object of this invention to prepare wax emulsions characterized by good storage stability. Another object of the invention is to provide a novel method for preparing said wax emulsions. Still another object of the invention is to make fibrous materials water repellent and resistant to soilage, and the production of such water repellent materials. Other objects and advantages of the invention will appear from the following description.

It has now been discovered that wax emulsions capable of imparting water repellency and possessing excellent storage stability are prepared by combining a mineral wax, a non-ionic emulsifying agent and a protective colloid, in balanced proportions. These novel emulsions are identified hereinafter as "base emulsions."

It has also been discovered that wax emulsions similarly characterized are prepared from the aforesaid base emulsions, an aluminum salt and a volatile organic acid, again in balanced proportions. Emulsions of this character are identified herein as "final emulsions."

The base emulsions of this invention are prepared by dissolving a protein such as gelatin, in water which contains some alkali, with the aid of heat. A mineral wax or waxes are melted together with a non-ionic emulsifier, and the molten mixture is added to the water phase with rapid agitation. The resultant crude emulsion is then processed through a homogenizer, colloid mill or similar equipment, whereupon the base emulsion is obtained. This base emulsion has excellent stability; and it is particularly advantageous inasmuch as it can be shipped to customers with instructions for adding the volatile organic acid and the aluminum salt, for preparation of the final waterproofing emulsion. This latter feature is of practical advantage since containers with acid-resistant linings are not necessary, as they are necessary for shipping of the final emulsions.

Preparation of the final emulsion involves chilling of the base emulsion, from the emulsification temperature of about 60° C. to about 95° C., to a temperature of about 35° C., followed by the addition thereto of a sufficient quantity of a volatile organic acid, such as acetic, to provide a hydrogen-ion concentration (pH) of less than about 4.5. It is advantageous to add the acid rapidly, with thorough agitation, so as to attain the desired pH in a short period of time, generally about several seconds to a minute. Following addition of the acid, the aluminum salt is added, also while agitating the acid solution. The resulting product is the final emulsion.

As indicated above, the base emulsion comprises mineral wax, a non-ionic emulsifier and a protein in balanced proportions. These proportions are:

|  | Weight, Percent | |
|---|---|---|
|  | General | Preferred |
| Mineral Wax | 12 to 45 | 20 to 30 |
| Non-ionic emulsifier | 0.2 to 5.0 | 0.5 to 2.5 |
| Protein | 0.5 to 8.0 | 2.0 to 4.0 |
| Alkali or alkaline salt, sufficient to provide pH of more than about | 7.5 | 8.0 |
| (generally) | 0.01 to 5.0 | 0.1 to 2.5 |

Correspondingly, the final emulsions are comprised of balanced proportions of the several components therein:

|  | Weight, Percent | |
|---|---|---|
|  | General | Preferred |
| Mineral Wax | 15 to 45 | 20 to 30 |
| Non-ionic emulsifier | 0.2 to 5.0 | 0.5 to 2.5 |
| Protein | 1.0 to 5.0 | 2.0 to 4.0 |
| Volatile organic acid, sufficient to provide pH of less than about | 4.5 | 4.0 |
| (generally) | 0.25 to 5 | 0.5 to 3.0 |
| Aluminum salt | 0.25 to 5.0 | 2.5 to 5.0 |
| Water | Balance | Balance |

Mineral wax, as contemplated herein, includes paraffin wax, for example, waxes having melting points of about 122° F., 137° F., etc.; microcrystalline wax of petroleum origin; ozokerite; ceresin; tank-bottom waxes; etc. A paraffin wax melting at about 122° F., for example, has been found to be highly satisfactory. Part of the mineral wax, generally up to about 25 per cent, can be replaced by oxidized microcrystalline wax (saponification values 30–100). Ester waxes can also be used in place of a minor portion of the mineral wax.

And a minor part of the mineral wax can be replaced by rosin or modified rosin such as hydrogenated or disproportionated rosin.

The emulsifying agents of this invention are non-ionic emulsifiers, that is, those which do not contain anions or cations in aqueous solutions. In particular, the emulsifying agents are mineral-wax-soluble or mineral-wax-dispersible esters of riconoleic acid and esters of an acylated ricinoleic acid. Preferred of such agents are the mono esters of mono-alcohols and the mono esters of di-alcohols. Typical agents are: methyl, ethyl, diethylene glycol, ethylene glycol mono esters; methyl acetyl ricinoleate and butyl acetyl ricinoleate.

Contemplated herein as proteins, substances which stabilize colloidal suspensions, are substances such as: gelatin or animal glue obtained by boiling animal cartilage; albumin; casein; and the like. Preferred herein is gelatin.

As indicated above, volatile organic acids are used in the preparation of the final emulsions of this invention. Representative of such acids are: acetic, formic, propionic, and glycolic acids. Acetic and formic acids have proven to be particularly advantageous and, therefore, are preferred. It is to be noted that the quantity of said acid used will vary considerably, dependent upon the quantity of other components of the emulsions; however, the quantity of acid used will be such as to provide a pH of less than about 4.5, and preferably from 3.5 to 4.0.

The novel emulsions of this invention are illustrated hereinbelow in Table I, in which are also illustrated, for purposes of comparison, emulsions illustrative of prior art. All of the emulsions, A through G, were prepared by the method described above.

from 30–100 can also be used. Oxidized microcrystalline waxes by themselves are quite incapable of effecting a stabilizing action upon the type of composition contemplated, as demonstrated by Example E. However, when combined with an ester of ricinoleic acid, oxidized microcrystalline waxes enhance the efficiency of the former, so that a definite synergistic effect is obtained.

As indicated hereinabove, the emulsions of this invention are advantageous for imparting water repellency to fibrous materials, such as textiles and paper. This is accomplished in the cutomary manner by contacting the fibrous material with an emulsion contained in an impregnating bath, and thereafter heating the material. The emulsions are also useful for imparting water repellency to other porous materials, such as masonry.

I claim:

1. A wax emulsion comprising: from about 12 to about 45 per cent by weight of mineral wax, from about 0.2 to about 5 per cent by weight of a non-ionic emulsifier selected from the group consisting of an ester of ricinoleic acid and an ester of an acylated ricinoleic acid, and from about 0.5 to about 8 per cent by weight of a protein, and the balance water.

2. A wax emulsion as defined by claim 1 wherein the mineral wax is a paraffin wax having a melting point of from about 110° F. to about 170° F.

3. A wax emulsion as defined by claim 1 wherein the non-ionic emulsifier is an ester of ricinoleic acid.

4. A wax emulsion as defined by claim 1 wherein the non-ionic emulsifier is an ester of an acylated ricinoleic acid.

5. A wax emulsion as defined by claim 1 wherein the protein is gelatin.

*Table I*

|  | A | B | C | D | E | F | G |
|---|---|---|---|---|---|---|---|
| Paraffin Wax (Melting Point 122° F.) | 20.0 | 20.0 | 20.0 | 20.0 | 20.0 | 20.0 | 20.0 |
| Oxidized Microcrystalline Wax |  |  |  | 1.0 | 2.0 |  |  |
| Ethylene Glycol Mono Ricinoleate | 2.0 |  |  |  |  |  |  |
| Methyl Ricinoleate |  | 2.0 |  | 1.0 |  |  |  |
| Butyl Acetyl Ricinoleate |  |  | 2.0 |  |  |  |  |
| Ethylene Oxide Condensation Product of Alkyl Phenol |  |  |  |  |  | 2.0 |  |
| Glyceryl Monostearate |  |  |  |  |  |  | 2.0 |
| Potassium Hydroxide |  | 0.05 |  |  |  |  |  |
| Triethanolamine |  |  | 0.38 |  |  |  |  |
| Borax |  |  |  | 0.25 | 0.25 |  |  |
| Water | 63.5 | 63.45 | 63.12 | 63.25 | 63.25 | 63.5 | 63.5 |
| Gelatin | 2.5 | 2.5 | 2.5 | 2.5 | 2.5 | 2.5 | 2.5 |
| Acetic Acid | 2.0 | 2.0 | 2.0 | 2.0 | 2.0 | 2.0 | 2.0 |
| 10% Aluminum Formate Solution | 10.0 | 10.0 | 10.0 | 10.0 | 10.0 | 10.0 | 10.0 |
| Total | 100.0 | 100.0 | 100.0 | 100.0 | 100.0 | 100.0 | 100.0 |
| pH of Base Emulsion | 6.4 | 8.0 | 8.5 | 8.5 | 8.4 | 6.4 | 6.4 |
| pH of Finished Emulsion | 3.75 | 3.7 | 3.8 | 3.7 | 3.8 | 3.8 | 3.7 |
| Stability at Room Temperature: |  |  |  |  |  |  |  |
| 1 Week — Separation of Water | None | None | None | None | Considerable | Severe | Severe |
| 1 Week — Skinning | Slight | do | Moderate | do | Severe | do | do |
| 2 Weeks — Separation of Water | Slight | do | do | do | do | do |  |
| 2 Weeks — Skinning | Moderate | Slight | do | do | do |  |  |
| 4 Weeks — Separation of Water | do | do | do | do |  |  |  |
| 4 Weeks — Skinning | Considerable | Moderate | Considerable | Very Slight |  |  |  |

As will be noted from the foregoing tabulation, emulsions A, B, C and D prepared in accordance with the present invention, are greatly superior to prior art emulsions F and G with respect to storage stability at room temperature. Whereas prior art emulsions were practically unusable at the end of one week, emulsions representing this invention were still usable at the end of four weeks. The superiority of emulsion A prepared with an ester of ricinoleic acid (ethylene glycol mono ricinoleate) as compared to emulsions F and G prepared with prior art emulsifiers, is striking. A further noticeable improvement is brought about by the addition of alkali to raise the pH of the "base emulsion" well above the neutral point as exemplified by Example B. Maximum stability is attained by combining an emulsifier of the present invention with the use of oxidized microcrystalline wax, preferably with a saponification value of about 45–50, although materials with a saponification value 6. A wax emulsion characterized by a high degree of stability on prolonged storage, and by a pH of less than about 4.5, comprising: from about 15 to about 45 per cent by weight of mineral wax, from about 0.2 to about 5.0 per cent by weight of non-ionic emulsifier selected from the group consisting of an ester of ricinoleic acid and an ester of an acylated ricinoleic acid, from about 1.0 to about 5.0 per cent by weight of a protein, from about 0.25 to about 5.0 per cent by weight of an aluminum salt of a volatile organic acid, a quantity of a volatile organic acid sufficient to provide a pH of less than about 4.5, and the balance water.

7. A wax emulsion as defined by claim 6 wherein the mineral wax is a paraffin wax having a melting point of from about 110° F. to about 170° F.

8. A wax emulsion as defined by claim 6 wherein from about 2.5 to about 25 per cent by weight of said mineral wax is replaced by an oxidized microcrystalline wax having a saponification value from about 30 to about 100.

9. A wax emulsion as defined by claim 6 wherein the non-ionic emulsifier is an ester of ricinoleic acid.

10. A wax emulsion as defined by claim 6 wherein the non-ionic emulsifier is an ester of an acylated ricinoleic acid.

11. A wax emulsion as defined by claim 6 wherein the protein is gelatin.

12. A wax emulsion as defined by claim 6 wherein the aluminum salt is aluminum formate.

13. A wax emulsion as defined by claim 6 wherein the volatile organic acid is acetic acid.

14. A process for imparting water repellency to a fibrous material, comprising: treating said material in an impregnating bath containing a wax emulsion characterized by a high degree of stability on prolonged storage, and by a pH of less than about 4.5, comprising: from about 15 to about 45 per cent by weight of mineral wax, from about 0.2 to about 5.0 per cent by weight of a non-ionic emulsifier selected from the group consisting of an ester of ricinoleic acid and an ester of an acylated ricinoleic acid, from about 1.0 to about 5.0 per cent by weight of a protein, from about 0.25 to about 5.0 per cent by weight of an aluminum salt of a volatile organic acid, a quantity of a volatile organic acid sufficient to provide a pH of less than about 4.5, and the balance water.

15. The method for forming a wax emulsion, comprising: absorbing a protein in water to establish a water phase; liquefying together a mineral wax and a non-ionic emulsifier selected from the group consisting of an ester of ricinoleic acid and an ester of an acylated ricinoleic acid; adding said mineral wax and said non-ionic emulsifier to said water phase; and homogenizing the mixture formed in the last-mentioned operation.

16. The method of forming a wax emulsion characterized by excellent stability upon prolonged storage, comprising: absorbing a protein in water to establish a water phase; liquefying together a mineral wax and a non-ionic emulsifier selected from the group consisting of an ester of ricinoleic acid and an ester of an acylated ricinoleic acid; adding said mineral wax and said non-ionic emulsifier to said water phase; homogenizing the mixture formed in the last-mentioned operation; chilling the homogenized mixture so obtained to a temperature from about 65° C. to about 35° C.; adding to the chilled mixture a sufficient quantity of a volatile organic acid to provide a hydrogen-ion concentration of less than about 4.5; and adding to the acid-mixture thus formed an aluminum salt.

17. The method of applying a wax emulsion to a fibrous material to impart water repellency thereto, which comprises: contacting a fibrous material with a wax emulsion comprising: from about 15 to about 45 per cent by weight of mineral wax, from about 0.2 to about 5.0 per cent by weight of a non-ionic emulsifier selected from the group consisting of an ester of ricinoleic acid and an ester of an acylated ricinoleic acid, from about 1.0 to about 5.0 per cent by weight of a protein, from about 0.25 to about 5.0 per cent of weight of an aluminum salt of a volatile organic acid, a quantity of a volatile organic acid sufficient to provide a pH of less than about 4.5, and the balance water; and then heating said material to evaporate the volatile acid therefrom.

References Cited in the file of this patent

UNITED STATES PATENTS

| | | |
|---|---|---|
| 2,015,865 | Muller | Oct. 1, 1935 |
| 2,172,392 | Kress et al. | Sept. 12, 1939 |
| 2,348,689 | Abrams | May 9, 1944 |
| 2,390,212 | Fritz | Dec. 4, 1945 |
| 2,456,595 | Rood | Dec. 14, 1948 |
| 2,625,491 | Young | Jan. 13, 1953 |

FOREIGN PATENTS

| | | |
|---|---|---|
| 479,313 | Canada | Dec. 11, 1951 |
| 540,650 | Great Britain | of 1941 |
| 552,447 | Great Britain | of 1943 |

FOREIGN PATENTS

"Surface Active Agents," by Schwarts et al., Interscience Publishers, Inc., New York, page 51.